United States Patent [19]

Hayakawa et al.

[11] Patent Number: 5,106,144
[45] Date of Patent: Apr. 21, 1992

[54] SEAT SLIDE DEVICE WITH RAIL-DISCONNECTION INHIBITING MECHANISM

[75] Inventors: Hatsuo Hayakawa; Mikio Honma; Hidemasa Hirakui, all of Yokohama; Hideki Irie; Mikio Fujiwara, both of Kanagawa, all of Japan

[73] Assignees: Ikeda Bussan Co., Ltd., Ayase; Ohi Seisakusho Co., Ltd., Yokohama, both of Japan

[21] Appl. No.: 652,874

[22] Filed: Feb. 7, 1991

[30] Foreign Application Priority Data

Feb. 9, 1990 [JP] Japan ................................ 2-28257

[51] Int. Cl.⁵ .................................................. B60N 2/08
[52] U.S. Cl. .................................. 296/68.1; 296/65.1; 248/429; 297/216
[58] Field of Search ............................ 296/65.1, 68.1; 248/429, 430; 297/216, 473

[56] References Cited

U.S. PATENT DOCUMENTS

| 4,776,551 | 10/1988 | Nishino | 248/429 |
| 4,787,667 | 11/1988 | Nishino | 296/68.1 X |
| 4,804,229 | 2/1989 | Nishino | 248/430 X |
| 4,941,636 | 7/1990 | Fujiwara et al. | 248/430 |
| 4,949,931 | 8/1990 | Fujiwara et al. | 248/429 |

FOREIGN PATENT DOCUMENTS

| 57-24594 | 5/1982 | Japan . | |
| 0064839 | 3/1988 | Japan | 248/430 |

Primary Examiner—Dennis H. Pedder
Attorney, Agent, or Firm—Foley & Lardner

[57] ABSTRACT

A seat slide device for a motor vehicle is shown, which includes a seat slide latching mechanism by which an upper movable rail can be latched at a desired fore-and-aft position relative to a lower stationary rail and a rail-disconnection inhibiting mechanism by which undesired separation of the upper rail from the lower rail is prevented even when a great load is applied to the rails due to a vehicle collision of the like. Lock openings formed in the lower rail can be used for not only the seat slide latching mechanism but also the rail-disconnection inhibiting mechanism. Thus, the lower rail has a satisfied mechanical strength.

9 Claims, 14 Drawing Sheets

2

SEAT SLIDE DEVICE WITH RAIL-DISCONNECTION INHIBITING MECHANISM

BACKGROUND OF THE INVENTION

1. Field of the Invention

The present invention relates in general to seat slide devices for motor vehicles, and more particularly, to seat slide devices of a type which can establish a latched engagement between upper and lower rails upon a vehicle collision or the like.

2. Description of the Prior Art

One of the seat slide devices of the above-mentioned type is shown in Japanese Utility Model Second Provisional Publication No. 57-24594.

The seat slide device of this publication comprises generally two lower rails which are secured to a vehicle floor, two upper rails which mount thereon a seat proper and are slidably engaged with the lower rails, a seat slide latching mechanism which latches the upper rails to the lower rails at desired fore-and-aft positions of the seat proper and a rail-disconnection inhibiting mechanism which establishes a latched engagement between the upper and lower rails upon application of great load to the rails due to a vehicle collision or the like.

The seat slide latching mechanism includes a plurality of lock openings which are formed in one of the lower rails and a latch bar which is held by one of the upper rails in a manner to be latchingly engageable with one of the lock openings.

The rail-disconnection inhibiting mechanism includes a plurality of stopper openings which are formed in a horizontal upper side part of each lower rail and a plurality of stopper pawls which are raised up from each upper rail and directed toward the apertured horizontal upper side part of the lower rail. When, due to a vehicle collision or the like, a great load is applied to the seat slide device in a direction to pull apart the upper and lower rails, the stopper pawls of the upper rails are brought into latching engagement with some of the stopper openings of the lower rails thereby suppressing disengagement of the upper rails from the lower rails.

However, due to provision of large number of openings in the lower rails, the above-mentioned conventional seat slide device fail to have a satisfied mechanical strength. In fact, at least one of the lower rails has not only the openings for the slide latch mechanism but also the openings for the rail-disconnection inhibiting mechanism, and thus the mechanical strength of this rail becomes poor.

SUMMARY OF THE INVENTION

It is therefore an object of the present invention to provide a seat slide device which is free of the above-mentioned drawback.

According to the present invention, there is provided a seat slide device for a motor vehicle. The seat slide device comprises a lower rail secured to a floor of the vehicle; an upper rail slidably engaged with the lower rail; a seat slide latching mechanism including a latch pawl movably held by the upper rail, means for defining at least one lock opening in the lower rail and biasing means for biasing the latch pawl in a direction to achieve a latched engagement between the latch pawl and the lock opening; and a rail-disconnection inhibiting mechanism including at least one latch projection defined by the upper rail and the lock opening, the latch projection being latchingly engageable with the lock opening when the upper rail is lifted up with respect to the lower rail.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
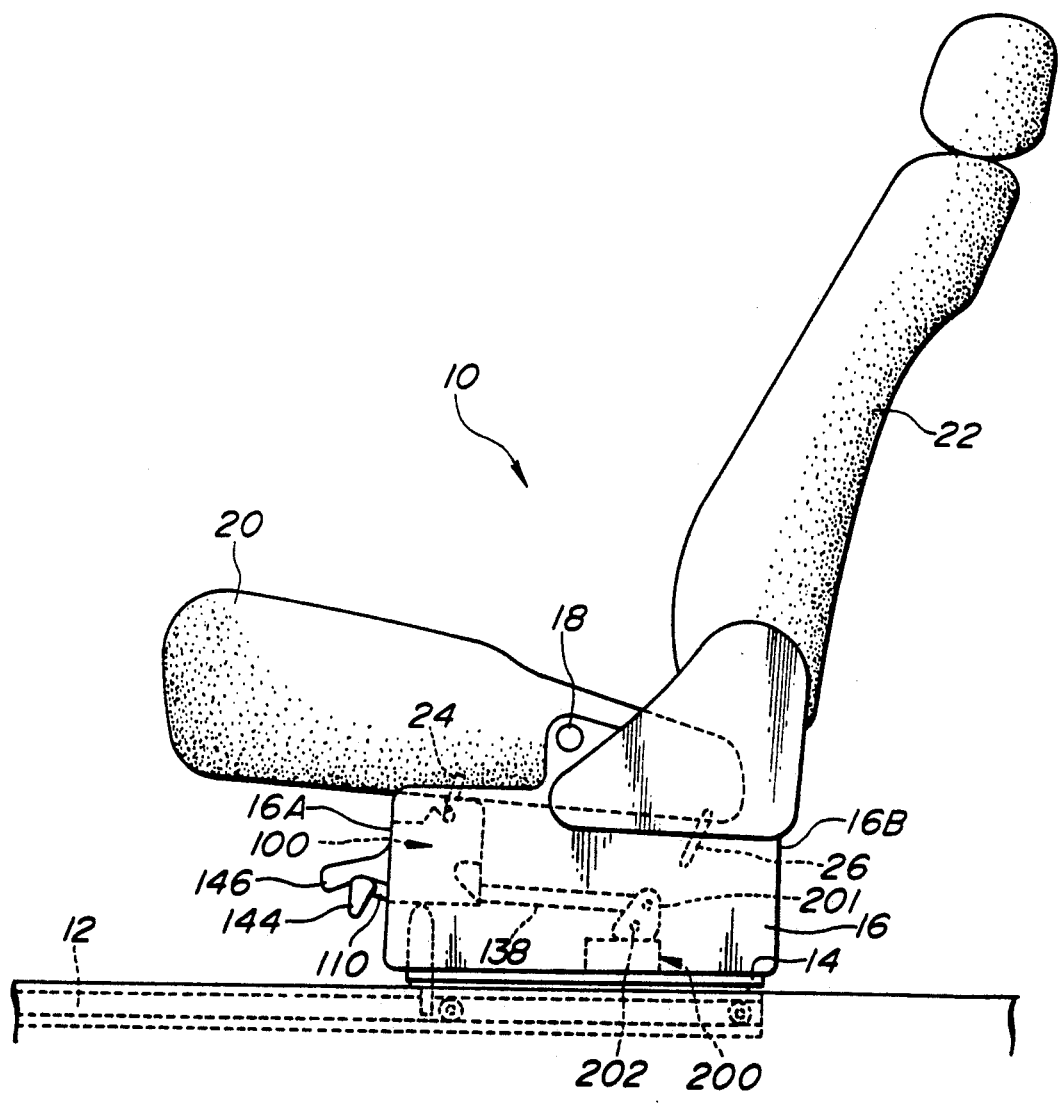
FIG. 1 is a side view of a seat assembly for a motor vehicle, to which a seat slide device of the present invention is applied.
Figure 2:
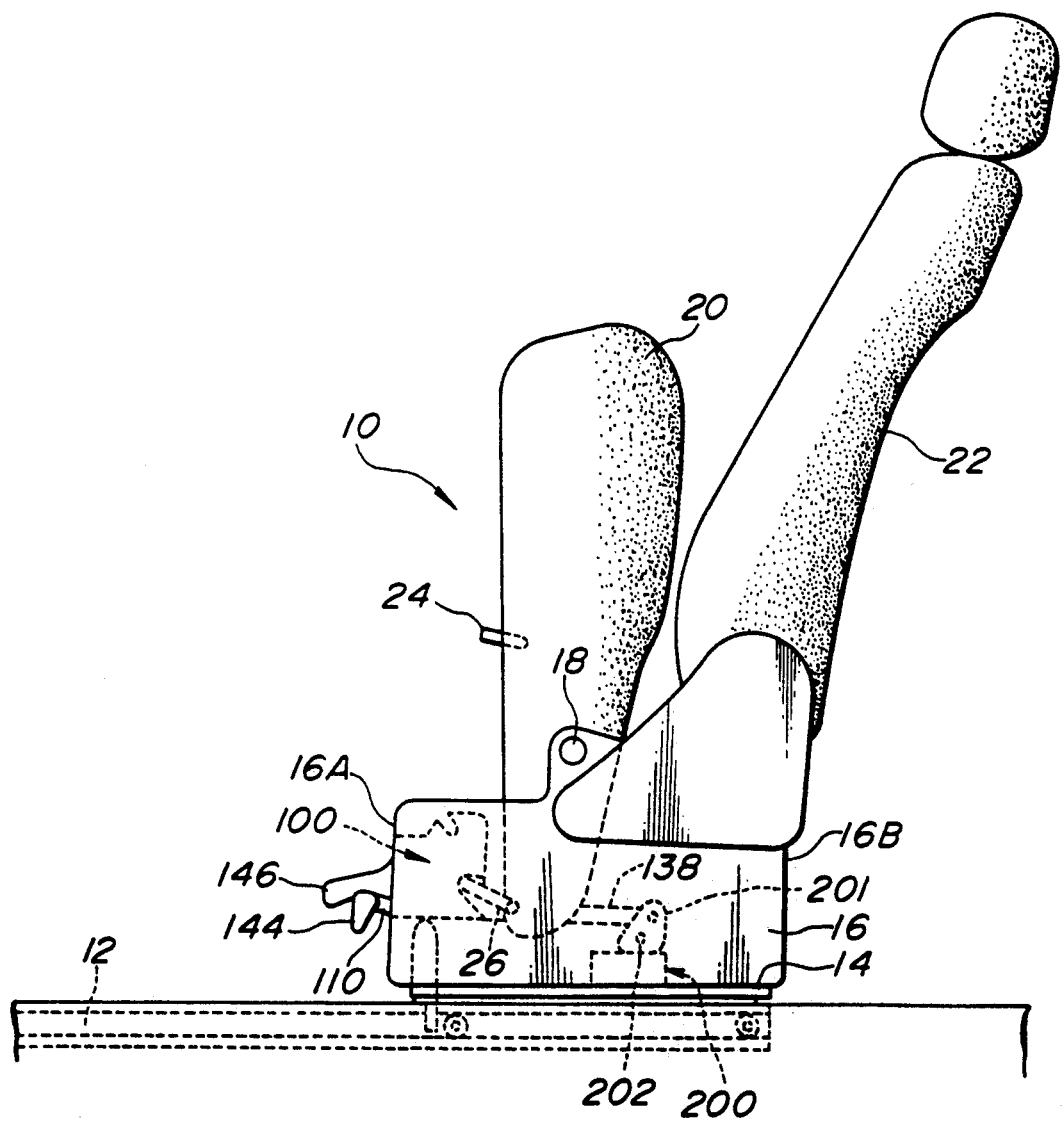
FIG. 2 is a view similar to FIG. 2, but showing a condition wherein a seat cushion of the seat assembly is folded up.

Referring to FIGS. 1 and 2 of the accompanying drawings, there is shown an automotive seat assembly 10 to which a seat slide device of the present invention is practically applied.

The seat assembly 10 generally comprises two lower rails 12 which are secured to a vehicle floor, two upper rails 14 which are slidably engaged with the fixed lower rails 12, two supporting members 16 which are respectively mounted on the upper rails 14, a seat cushion 20 which is pivotally held by the supporting members 16 by means of a pivot shaft 18, so that the seat cushion 20 can take a horizontal operative (viz., seat occupant holding) position as shown in FIG. 1 and a folded up position as shown in FIG. 2, and a seatback 22 which is mounted to the supporting members 16 through a known reclining mechanism, so that the inclination angle of the seatback 22 relative to the seat cushion 20 is adjustable.

As will become apparent as the description proceeds, the forward movement of the seat assembly 10 is carried out with the seat cushion 20 kept folded up as shown in FIG. 2. When thus the seat assembly 10 assumes a front position, a larger luggage space is defined behind the seat assembly 10 in the vehicle cabin.

The seat cushion 20 has at its lower surface a first striker 24 secured thereto and at its rear lower surface a second striker 26 secured thereto. Each striker 24 or 26 is generally U-shaped having the foot portions secured to the lower surface of the seat cushion 20. Reinforcing members are used for assuring the connection of the strikers 24 and 26 to the seat cushion 20.

Figure 3:
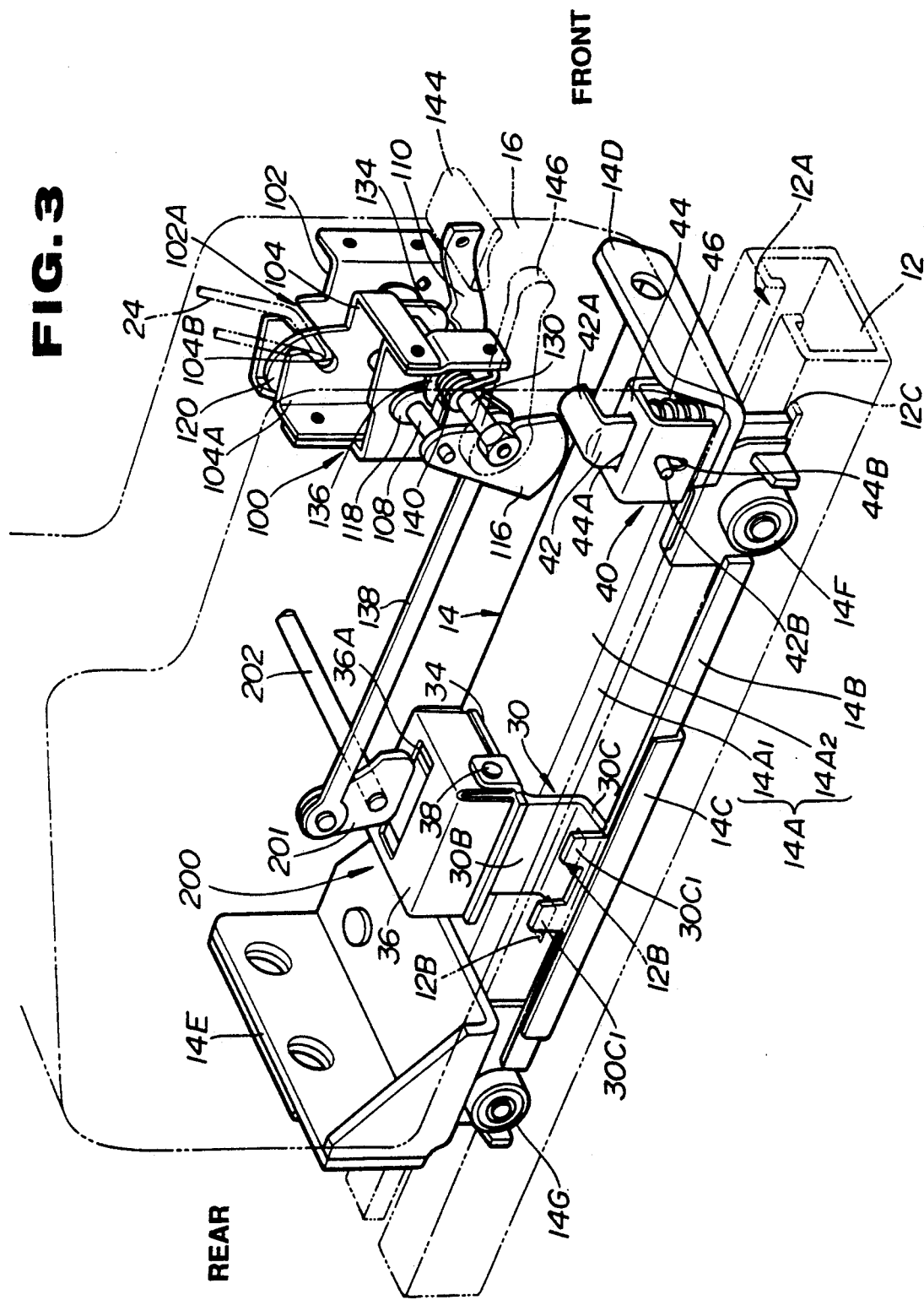
FIG. 3 is a perspective view of an essential portion of the seat assembly.

As is seen from FIG. 3, the supporting member 16 illustrated in this drawing is a member which is placed at a right side of the seat assembly 10 with respect to a seat occupant sitting on the seat proper 20. The supporting member 16 is mounted on an upper flat surface of the upper rail 14.

Figure 6:
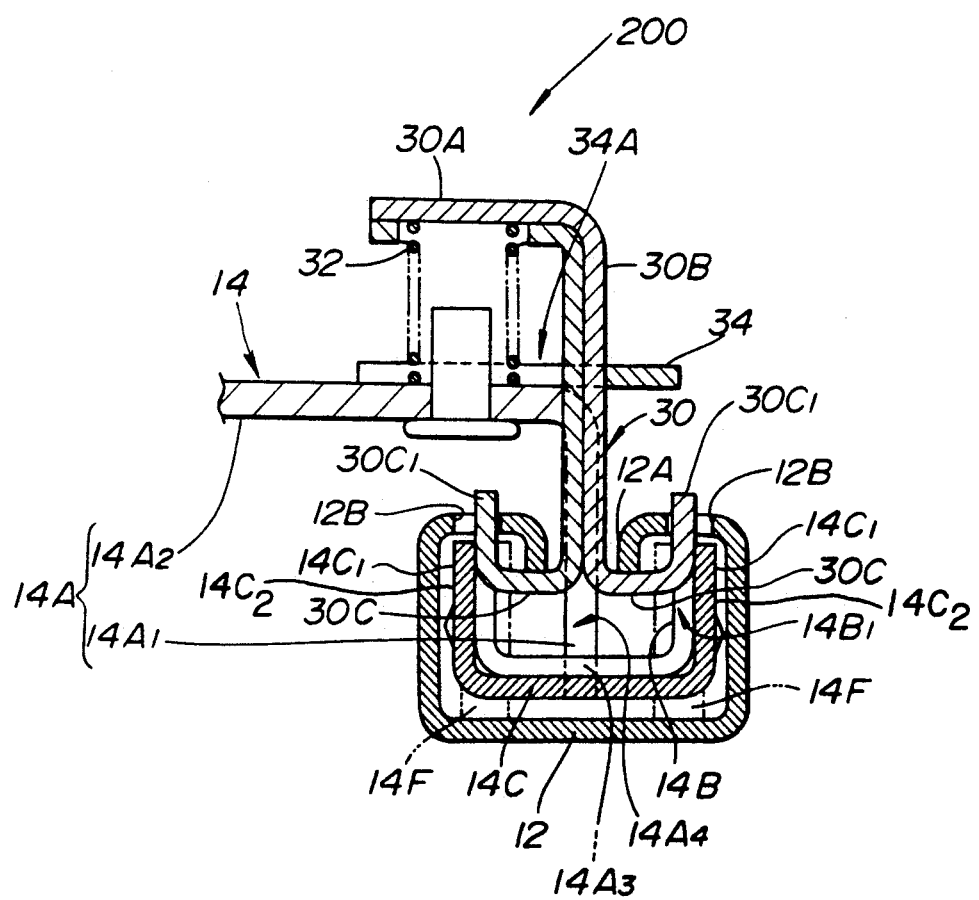
FIG. 6 is a sectional view of the seat slide latching mechanism.

As is understood from FIG. 6, the upper rail 14 comprises an upper rail major portion 14A of generally L-shaped cross section which includes a vertical part 14A1 and a horizontal part 14A2, a longer inside reinforcing member 14B of generally C-shaped cross section which is welded along its center axis to the lower end of the vertical part 14A1 having the open side thereof directed upward, and a shorter outside reinforcing member 14C of generally C-shaped cross section which is welded along its center axis to both the lower end of the vertical part 14A1 and the inside reinforcing member 14B having the open side thereof directed upward. For assuring the connection of each reinforcing member 14B or 14C with the major portion 14A, the lower end of the vertical part 14A1 is formed with a plurality of projections 14A3 each being received in corresponding aligned bores (no numerals) formed in the intimately overlapped parts of the inside and outside reinforcing members 14B and 14C.

As is seen from FIG. 3, two mounting brackets 14D and 14E are secured to front and rear ends of the horizontal part 14A2 of the upper rail 14 for tightly supporting thereon the supporting member 16.

As is understood from FIGS. 3 and 6, the lower rail 12 has a generally C-shaped cross section and is arranged in a manner to have the axially extending slit 12A thereof directed upward. The overlapped inside and outside reinforcing members 14B and 14C of the upper rail 14 are slidably received in the lower rail 12 having the vertical part 14A1 projected upward through the slit 12A. The entire of the lower rail 12 is accommodated in a groove formed in the vehicle floor as is seen from FIGS. 1 and 2.

As is seen from FIGS. 3 and 6, the upper horizontal wall of the lower rail 12 is formed at its front and rear portions with front and rear groups of lock openings 12B, each group including two pairs of openings 12B. For the reason which will be clarified hereinafter, the size of each lock opening 12B is somewhat enlarged as may be understood from FIG. 6.

In the disclosed embodiment, the vertical part 14A1 of the upper rail 14 is provided at its front and rear ends with paired rollers 14F and 14G respectively, which rollers run on a flat bottom surface of the lower rail 12. Thus, the upper rail 14 can smoothly move relative to the lower rail 12.

Referring to FIGS. 3 to 6, particularly FIG. 6, designated by numeral 200 is a seat slide latching mechanism which is an essential mechanism employed in the seat slide device of the present invention.

Figure 4:
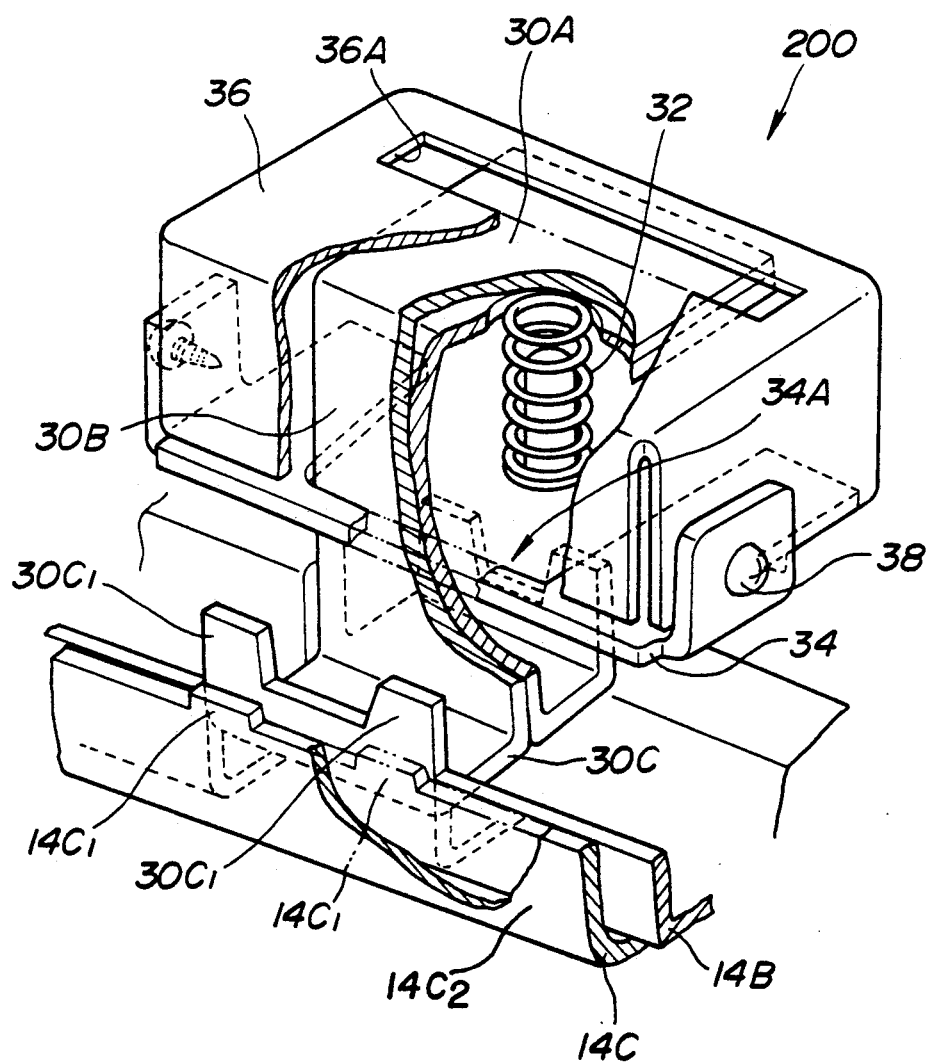
FIG. 4 is a partially cut perspective view of a seat slide latching mechanism employed in the seat slide device of the present invention.

As is seen from FIGS. 3 and 4, the seat slide latching mechanism 200 has a latch member 30 which is carried on the upper rail 14 for the purpose of latching and unlatching the upper rail 14 relative to the lower rail 12.

As is understood from FIGS. 4 and 6, the latch member 30 comprises a horizontal portion 30A, a vertical portion 30B extending downward from one side of the horizontal portion 30A and paired hook portions 30C provided at a lower part of the vertical portion 30B. The hook portions 30C are secured to each other in a back-to-back fashion.

The paired hook portions 30C are vertically movably received within the shorter outside reinforcing member 14C of the upper rail 14. For this, the vertical part 14A1 of the upper rail 14 is formed with an aperture 14A4 to receive therein the vertical portion 30B of the latch member 30, and the longer inside reinforcing member 14B is formed at its side walls with aligned cuts 14B1 to receive the therein the hook portions 30C of the latch member 30.

Each hook portion 30C is formed with two upwardly projcted latch pawls 30C1 which are latchingly engageable with corresponding two of the lock openings 12B of the lower rail 12. Between the horizontal portion 30A of the latch member 30 and the horizontal part 14A2 of the upper rail 14, there is compressed a coil spring 32 for biasing the latch member 30 upward, that is, in a direction to achieve the engagement of the latch pawls 30C1 with the lock openings 12B of the lower rail 12.

As is described hereinafore, the arrangement of the latch member 30 relative to the upper rail 14 is so made that the vertical portion 30B is vertically movably received in the aperture 14A4 of the vertical portion 14A1 of the upper rail 14 and the hook portions 30C are vertically movably received in the aligned cuts 14B1 of the longer inside reinforcing member 14B.

The horizontal portion 14A2 of the upper rail 14 has a base plate 34 secured thereto. The base plate 34 is formed with a cut 34A through which the vertical portion 30B of the latch member 30 passes. As is seen from FIG. 3 and 4, a rectangular housing 36 is mounted on and secured to the base plate 34 by means of screws 38 to house the upper portion of the latch member 30. The housing 36 is formed with an elongate aperture 36A through which the horizontal portion 30A of the latch member 30 is partially exposed.

Thus, usually, due to the force of the compression spring 32, the latch member 30 is biased upward relative to the upper rail 14. However, when the latch member 30 is applied with a considerable downward force, the same moves downward against the biasing force of the spring 32, that is, in a direction to disengage the latch pawls 30C1 from the lock openings 12B of the lower rail 12.

Figure 5:
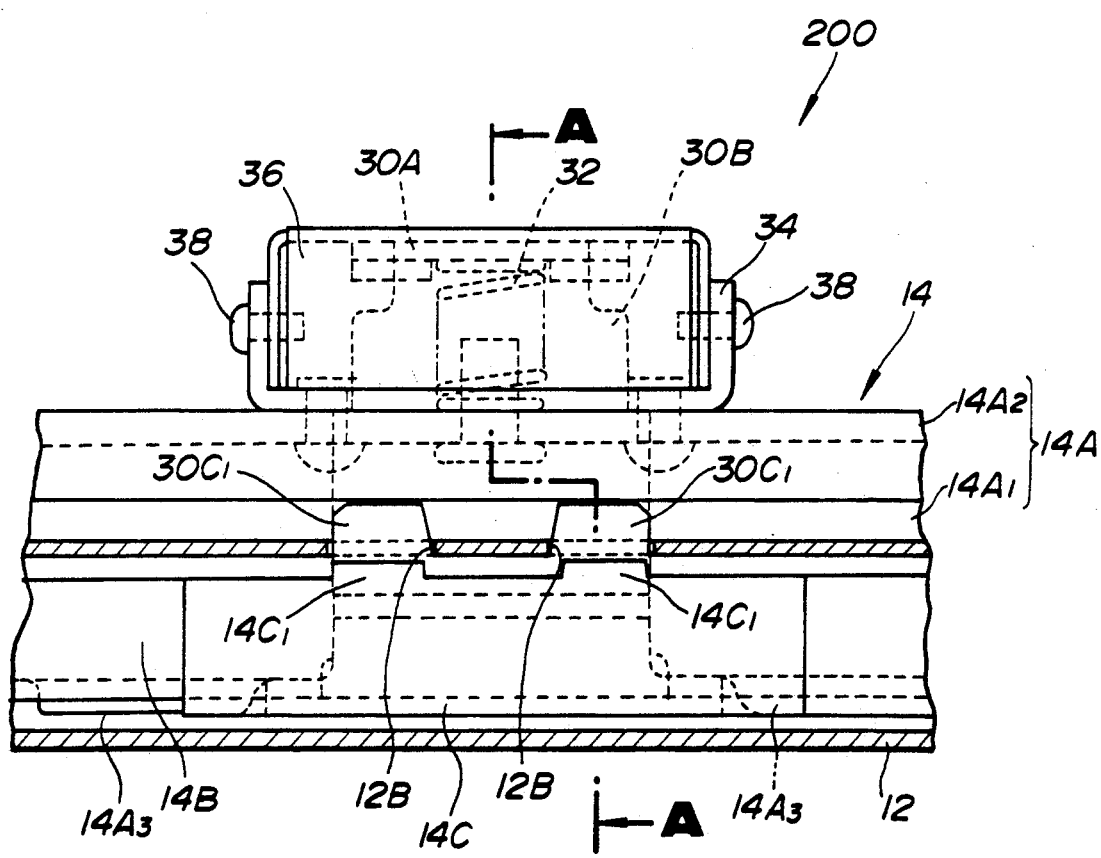
FIG. 5 is a side view of the seat slide latching mechanism with a lower rail partially cut.

As is seen from FIGS. 4, 5 and 6, the two side wall reinforced members 14C2 of the shorter outside reinforcing member 14C have each two latch projections 14C1 at positions beside the latch pawls 30C1 of each hook portion 30C of the latch member 30.

It is to be noted that the latch projections 14C1 of the lower rail 14 and the lock openings 12B of the upper rail 12 constitute a so-called "rail-disconnection inhibiting mechanism" which, as will be described hereinafter, fulfills its function when a great load is applied to the rails 12 and 14 due to a vehicle collision or the like.

Due to the reason as mentioned hereinabove, the latch projections 14C1 and the latch pawls 30C1 have no relative displacement with respect to a movement in a fore-and-aft direction while permitting a vertical movement of the latch pawls 30C1 relative to the latch projections 14C1. As is seen from FIG. 6, usually, there remains a certain clearance between each latch projection 14C1 and the upper horizontal wall of the lower rail 12.

It is to be noted that each lock opening 12B (see FIG. 6) is so sized as to latchingly receive a unit which consists of one latch pawl 30C1 and an associated latch projection 14C1.

As is seen from FIG. 3, to the front mounting bracket 14D, there is mounted a sensor mechanism 40 which manages the latch cancelling operation of a seat cushion latching mechanism 100 which will be described hereinafter.

The sensor mechanism 40 comprises a vertically movable actuating lever 42 which has a bent upper portion 42A. A guide pin 42B is fixed to a middle part of the actuating lever 42 to move therewith. The actuating lever 42 has a lower portion projected into the lower rail 12 through mated apertures (not shown) formed in the mounting bracket 14D and the horizontal portion 14A2 of the upper rail 14. A generally U-shaped bracket 44 is secured to the front mounting bracket 14D for guiding the movement of the actuating lever 42. For this guiding, the bracket 44 has at its upper bridge part an elongate slot 44A through which the upper portion of the actuating lever 42 projects outward and at one side wall part a vertically extending guide slot 44B through which the guide pin 42B projects outward. A compression spring 46 is installed in the bracket 44 to bias the actuating lever 42 upward, that is, in a direction to achieve an abutment of the guide pin 42B with an upper end of the guide slot 44B.

When, with the upper rail 14 assuming a given latched position relative to the lower rail 12, the actuating lever 42 is pressed down, the lower end of the same is inserted into a positioning opening 12C formed in a given part of the base portion of the lower rail 12.

Figure 7:
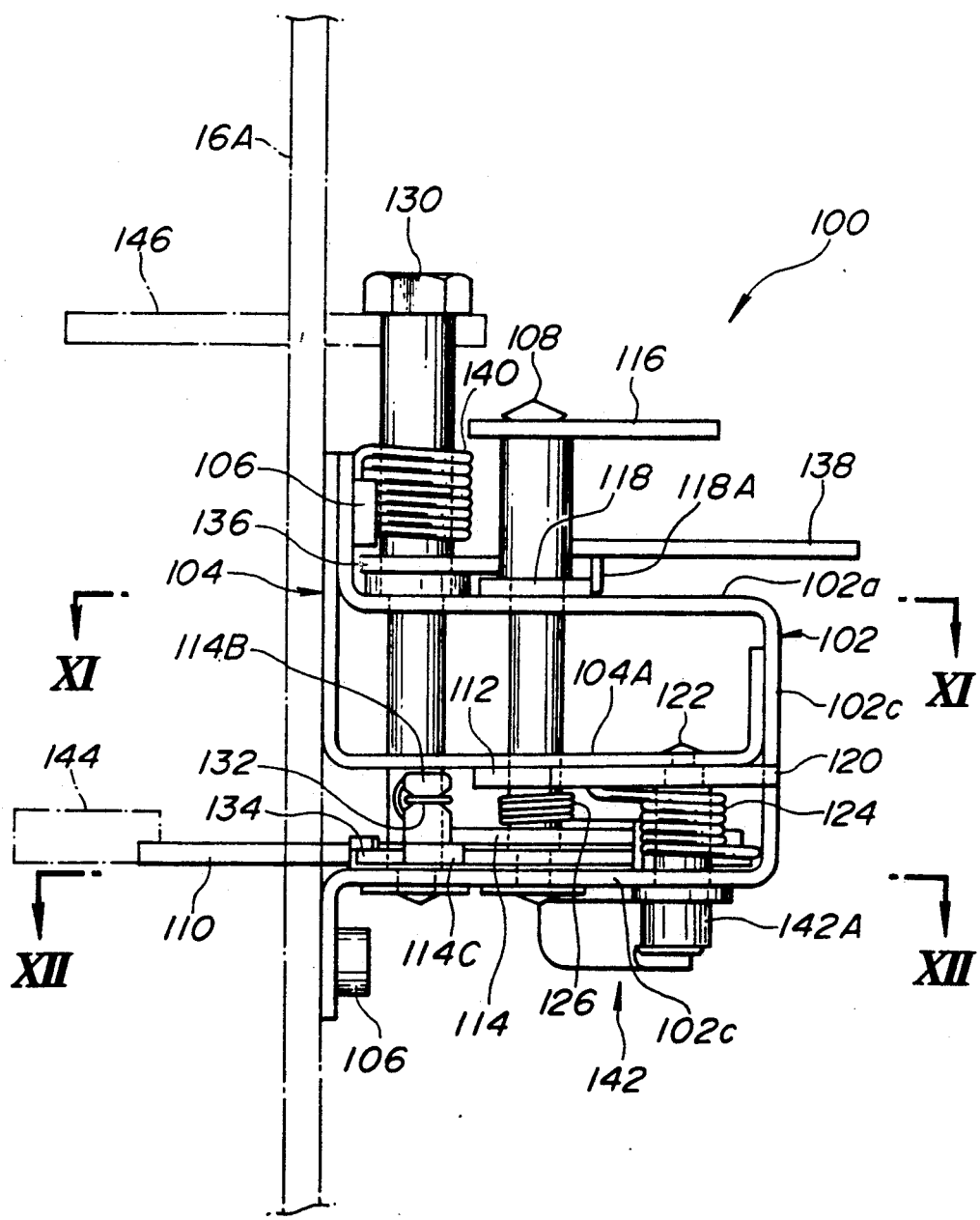
FIG. 7 is a plan view of a seat cushion latching mechanism employed in the seat assembly.

Referring to FIGS. 3 and 7, the seat cushion latching mechanism 100 a base structure which is secured to a front wall 16A of the supporting member 16.

As is best seen from FIG. 7, the base structure includes a first base plate 102 and a second base plate 104. The first base plate 102 is generally U-shaped having opposed side walls 102a and 102b connected through a base wall 102c. The second base plate 104 is generally L-shaped and secured to the first base plate 102 in a manner to form an intermediate wall 104A between the opposed side walls 102a and 102b. The base structure (102+104) has a plurality of welded nuts 106 with which bolts (not shown) are engaged to secure the base structure (102+104) to the front wall 16A of the supporting member 16.

Designated by numeral 108 is a first pivot shaft which is rotatably supported by the base structure (102+104). More specifically, the first pivot shaft 108 passes through three aligned openings which are formed in the opposed side walls 102a and 102b of the first base plate 102 and the intermediate wall 104A of the second base plate 104.

An operation lever 110 is secured to the first pivot shaft 108 to pivot therewith. The operation lever 110 has a front portion which is exposed to the front of the front wall 16A. A first control handle 144 is secured to the exposed front end of the operation lever 110.

As will be described in detail hereinafter, a latching plate 112 and a latch condition detecting lever 114 are pivotally connected to the first pivot shaft 108, and a cam plate 116 and a pawl member 118 are secured to the first pivot shaft 108 to pivot therewith.

Designated by numeral 120 is a first latch member which can be latched by the above-mentioned latching plate 112. The first latch member 120 is pivotally disposed about a shaft 122 which is secured to the side wall 102b and the intermediate wall 104A of the base structure (102+104) spanning them. A coil spring 124 is disposed about the shaft 122 to bias the first latch member 120 in a clockwise direction in FIG. 3, that is, in a clockwise direction in FIG. 9.

Figure 9:
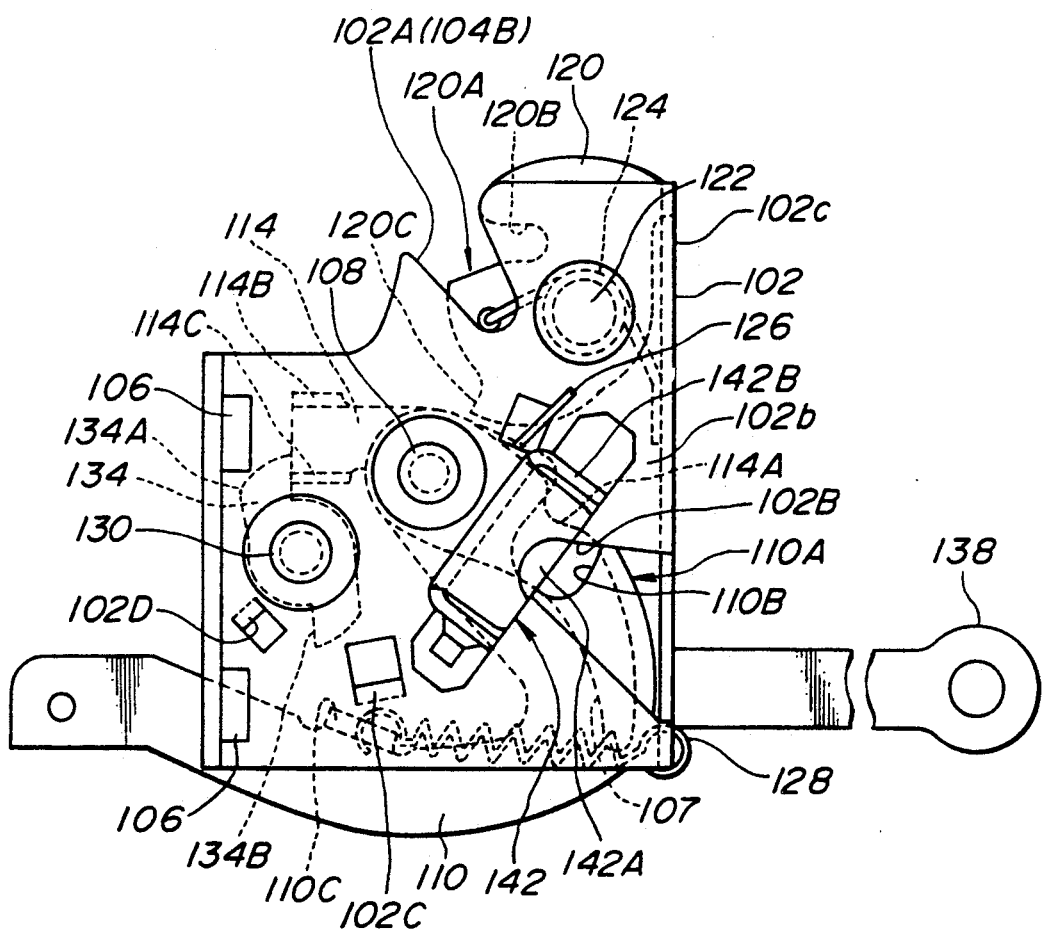
FIG. 9 is a left-side view of the seat cushion latching mechanism with a locking plate removed for clarification of the drawing.

As is understood from FIGS. 3 and 9, the side wall 102b and the intermediate wall 104A of the base structure (102+104) have at their upper portions respective recesses 102A and 104B which are so aligned and sized as to receive the above-mentioned first striker 24.

The first latch member 120 is formed with a striker catching recess 120B by which the first striker 24 can be caught. The catching recess 120B has a lower peripheral side 120A against which the first striker 24 is collidable. Furthermore, the first latch member 120 is formed with a stepped portion 120C with which an end of the latching plate 112 is latchingly engageable.

Figure 12:
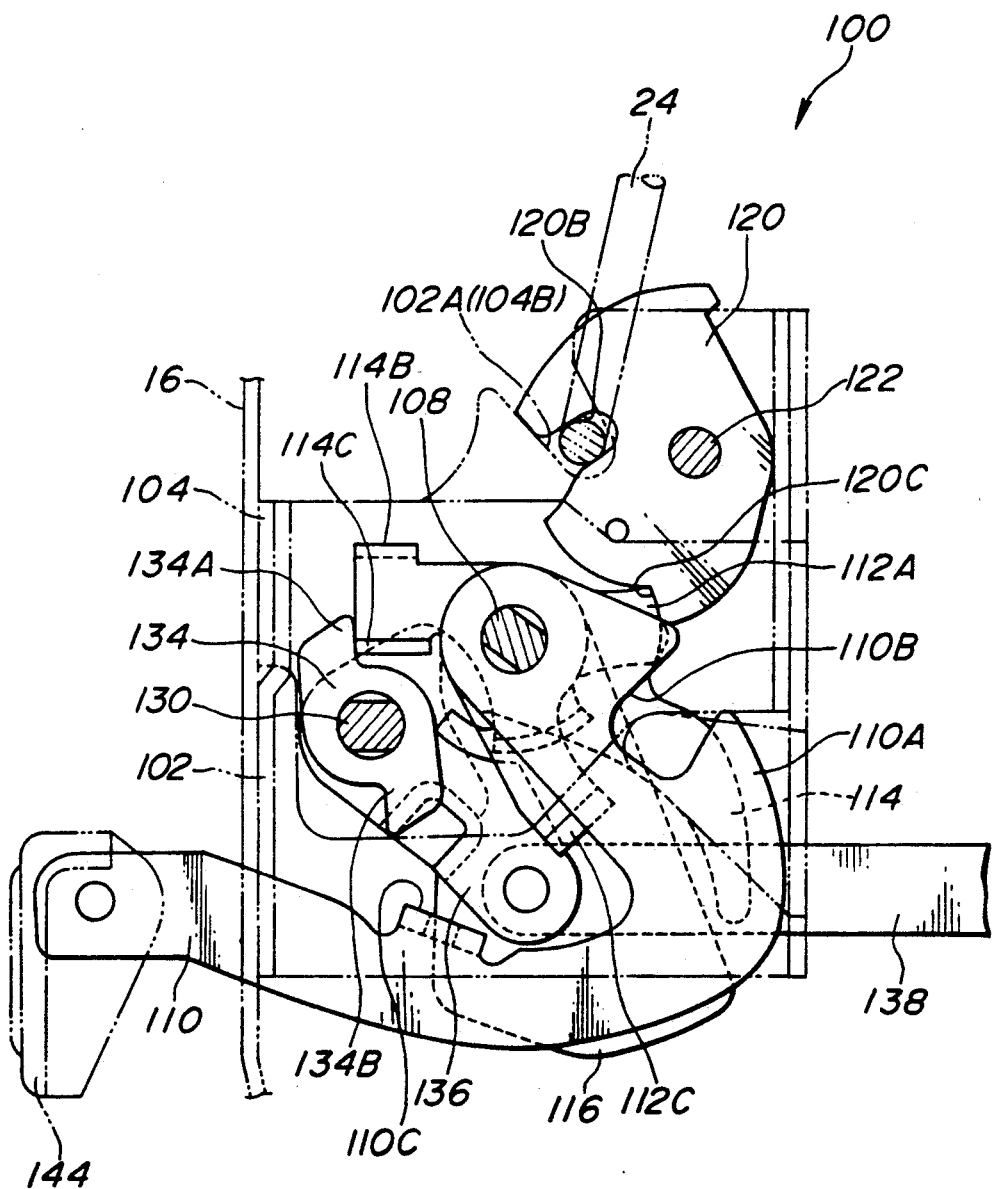
FIG. 12 is a sectional view taken along the line XII—XII of FIG. 7.
Figure 13:
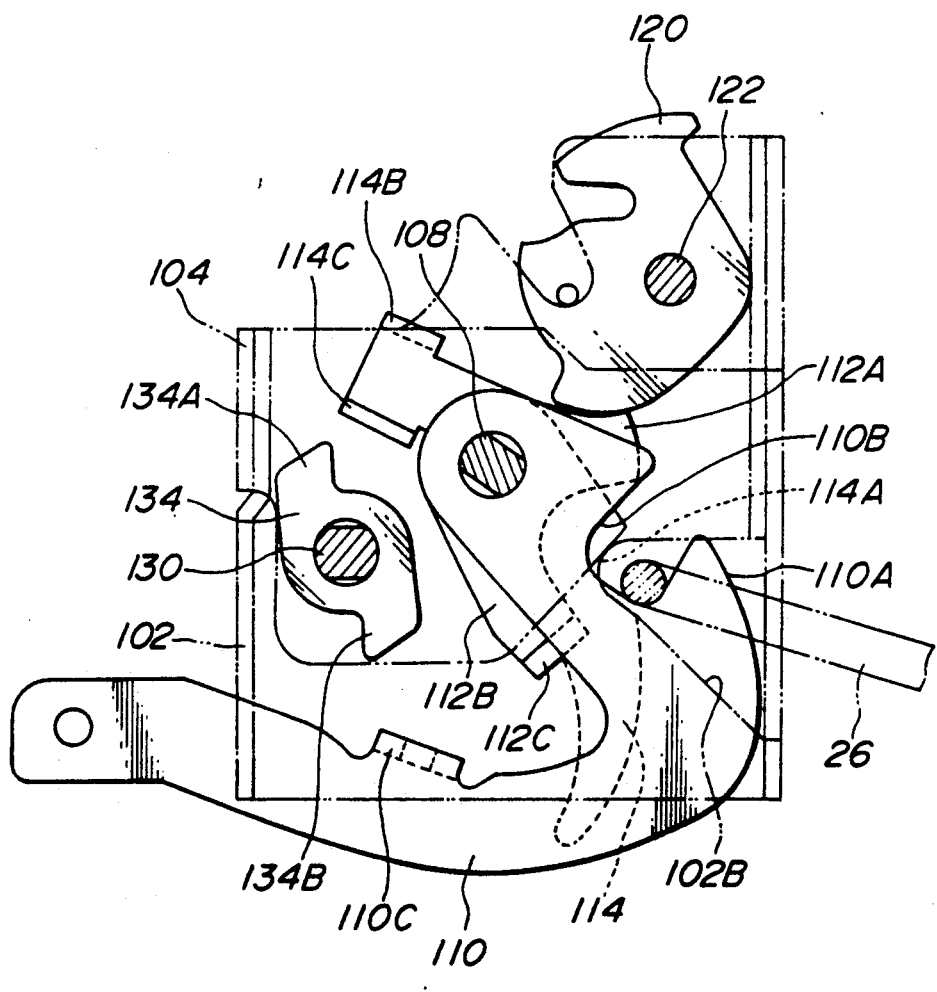
FIG. 13 is a view similar to FIG. 12, but showing a different condition of the seat cushion latching mechanism.
Figure 14:
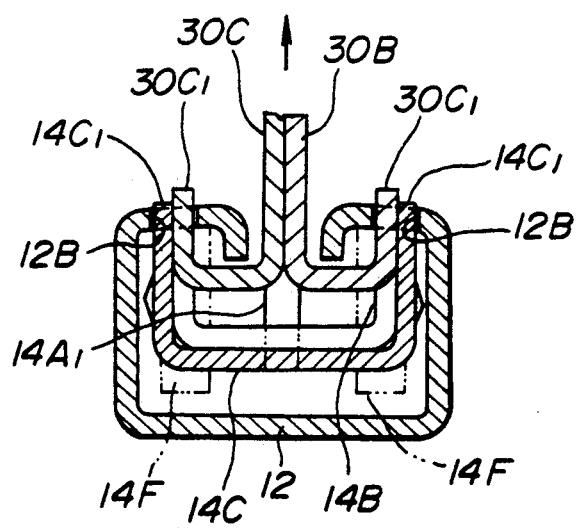
FIG. 14 is a view similar to FIG. 6, but showing a condition wherein an associated motor vehicle is subjected to a vehicle collision.

As is seen from FIGS. 12 and 13, the latching plate 112 is generally L-shaped and has a first leg portion 112A whose leading end is latchingly engageable with the stepped portion 120C of the first latch member 120, and a second leg portion 112B whose leading end has a bent portion 112C. The latching palte 112 is biased in a counterclockwise direction in FIG. 12 by a coil spring 126 (see FIG. 7) disposed about the first pivot shaft 108. Due to the force of the coil spring 126, the bent portion 112C of the latching plate 112 is forced to abut against the operation lever 110 to bias the same in the counterclockwise direction in FIG. 12.

The operation lever 110 can serve as a second latch member by which the afore-mentioned second striker 26 can be caught. For this, the operation lever 110 is shaped like the letter "J". The operation lever 110 is secured at its base portion to the first pivot shaft 108, as has been described hereinafore.

The operation lever 110 is formed near the base portion with a striker catching recess 110B by which the second striker 26 can be caught. The catching recess 110B has a lower shoulder portion 110A against which the second striker 26 is collidable. The operation lever 110 further has at a portion remote from the base portion a bent portion 110C.

As is seen from FIG. 9, a spring 128 extends between the base wall 102c of the base structure (102+104) and the bent portion 110C of the operation lever 110, so that the operation lever 110 is biased in a counterclockwise direction in this drawing to abut against a portion of the base structure (102+104).

As is understood from FIG. 9, the side wall 102b and the base wall 102c of the base structure (102+104) are partially cut away to form an opening or recess 102B which is sized to accommodate the second striker 26.

The side wall 102b of the base structure () is integrally formed with a raised stopper piece to which the operation lever 110 is contactable thereby to restrict the upward pivoting of the opertion lever 110 to a certain degree.

As is understood from FIG. 9, the latch condition detecting lever 114 is generally J-shaped, whose terminal end portion is located near the recess 102B. The detecting lever 114 is formed at its middle portion with a recess 114A with which the second striker 26 is engageable. The detecting lever 114 is further formed at its head portion with first and second bent portions 114B and 114C which face each other.

As is seen from FIG. 7, the first bent portion 114B of the detecting lever 114 holds one end of a spring 132 whose other end is hooked to a second pivot shaft 130 which will be described hereinafter. With the spring 132, the latch condition detecting lever 114 is biased to pivot about the first pivot shaft 108 in a counterclockwise direction in FIG. 9.

As is seen from FIG. 7, the second pivot shaft 130 extends in parallel with the first pivot shaft 108 and is pivotally supported by the side walls 102a and 102b and the intermediate wall 104A of the base structure (102+104).

A stopper member 134 and an arm member 136 are secured to the second pivot shaft 130 to pivot therewith.

As is seen from FIG. 9, the stopper member 134 is formed at diametrically opposed portions of the second pivot shaft 130 with first and second stopper parts 134A and 134B. The first stopper part 134A is engageable with the second bent portion 114C of the latch condition detecting lever 114, while the second stopper part 134B is engageable with an engaging part 102D which is raised from the side wall 102b of the base structure (102+104).

Figure 11:
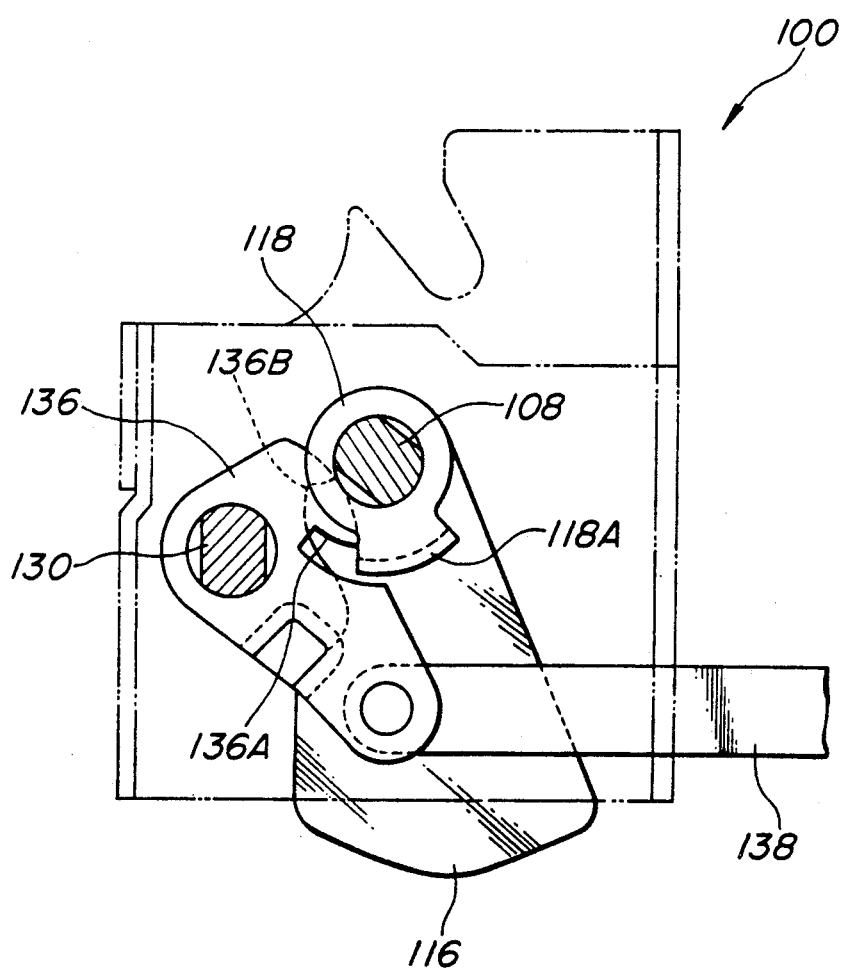
FIG. 11 is a sectional view taken along the line XI—XI of FIG. 7.

As is seen from FIG. 11, the arm member 136 has a leading end to which a connecting link 138 from the seat slide latching mechanism 200 is pivotally connected. The arm member 136 is formed at its middle portion with an arcuate recess 136A. Under an aftermentioned given condition, a pawl 118A of the pawl member 118 is inserted into the arcuate recess 136A to suppress the pivotal movement of the arm member 136. The arm member 136 further has an arcuate peripheral portion 136B (see FIG. 11) which is contactable with the pawl 118A.

Figure 8:
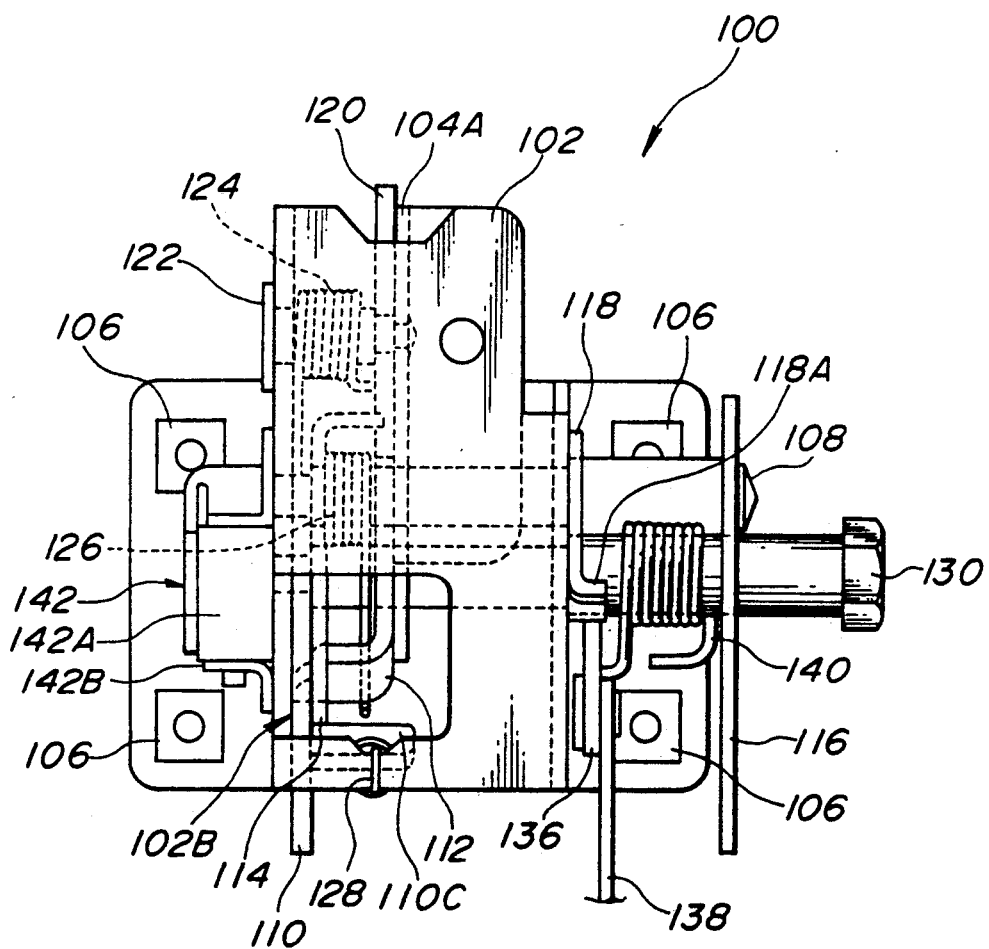
FIG. 8 is a back view of the seat cushion latching mechanism of FIG. 7.
Figure 10:
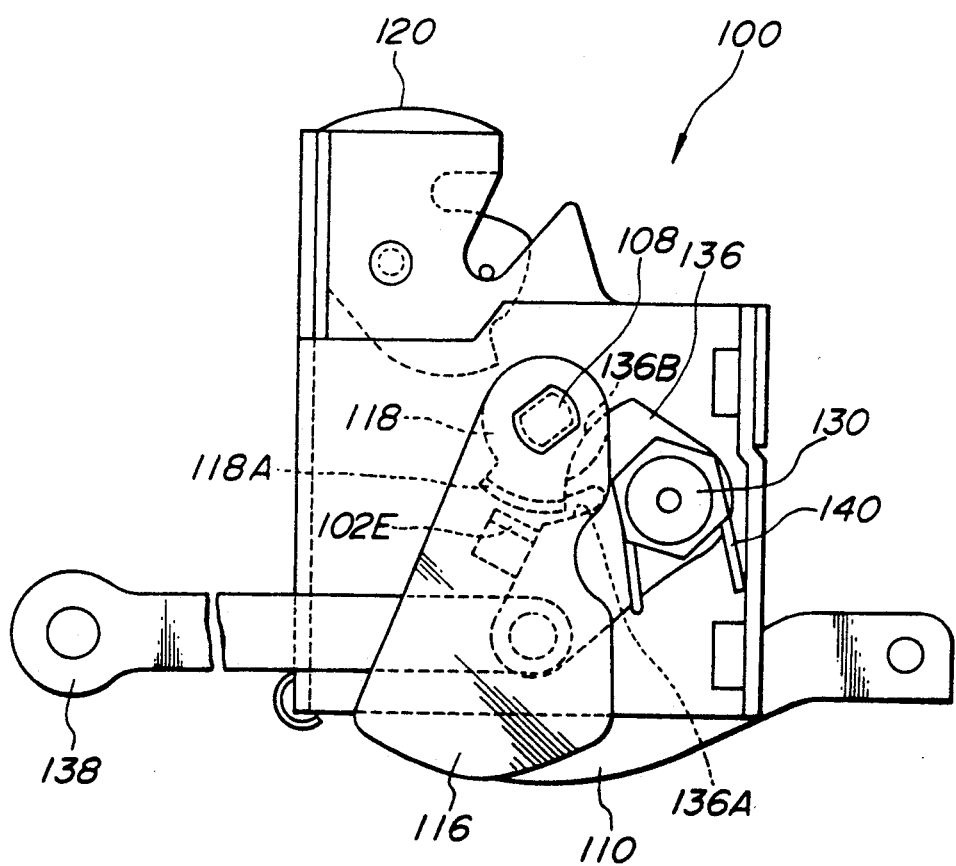
FIG. 10 is a right-side view of the seat cushion latching mechanism.

As is seen from FIGS. 7 and 8, a coil spring 140 is disposed about the second pivot shaft 130 to bias the arm member 136 and thus the second pivot shaft 130 in a counterclockwise direction in FIG. 9, that is, in a clockwise direction in FIG. 10.

As is seen from FIG. 10, with the biasing force of the spring 140, the arm member 136 is forced to contact with a stopper piece 102E pressed out of the side wall 102a of the base structure (102+104).

Designated by numeral 142 in FIGS. 7, 8 and 9, particularly in FIG. 9, is a damper device which is mounted to the side wall 102b of the base structure (102+104) near the recess 102B. The damper device 142 comprises an elastic member 142A which is exposed to the recess 102B and a case 142B which is secured to the side wall 102b to house the elastic member 142A. As is understood from FIG. 9, the damper device 142 damps a shock produced when the second striker 26 is led into the recess 102B.

As is seen from FIGS. 3 and 7, a second control handle 146 is secured to the second pivot shaft 130 to manually operate the same, which handle has a front portion exposed to the front of the front wall 16A of the supporting member 16.

As is seen from FIG. 3, the connecting link 138 extends toward the seat slide latching mechanism 200 to control the same.

That is, the connecting link 138 has a rear end pivotally connected to a cam plate 201 which is connected to a pivot shaft 202. The pivot shaft 202 is supported by the right and left supporting members 16 in a manner to rotate about its axis. The cam plate 201 is in contact with the horizontal portion 30A of the latch member 30 through the elongate aperture 36A of the housing 36. Thus, upon rotation of the cam plate 201 in a given direction, the latch member 30 is pressed downward and thus the latched engagement between the upper and lower rails 14 and 12 becomes cancelled permitting free movement of the seat assembly 10 on and along the fixed lower rails 12.

The cam plate 116 fixed to the first pivot shaft 108 has a cam surface slidably engaged with the bent upper portion 42A of the actuating lever 42.

In the following, operation will be described.

For ease of understanding, the description will be commenced with respect to the condition of FIG. 1 wherein the seat assembly 10 assumes its rear latched position and the seat cushion 20 assumes its horizontal operative latched (or seat occupant holding) position.

Under this condition, the seat slide latching mechanism 200 assumes a condition wherein the latch member 30 (more specifically, the latch pawls 30C1) is latchingly engaged with the rear group of lock openings 12B and the seat cushion latching mechanism 100 assumes a so-called "first striker latching condition", as depicted by FIG. 12. That is, the first striker 24 is received in the aligned recesses 102A and 104B of the base structure (102+104) and latchingly caught by the catching recess 120B of the first latch member 120. Due to the biasing force of the coil spring 124, the stepped portion 120C of the first latch member 120 is forced to abut against the first leg portion 112A of the latching plate 112 thereby keeping the first latch member 120 at the latching position. Furthermore, due to the force of the spring 132, the latch condition detecting lever 114 is biased in a counterclockwise direction in FIG. 12 causing the second bent portion 114C thereof to engage with the first stopper part 134A of the stopper member 134. Accordingly, rotation of the second pivot shaft 130 and thus that of the arm member 136 in a clockwise direction in FIG. 12 due to manipulation of the second control handle 146 is suppressed. That is, a movement of the connecting link 138 in a direction to operatively pivot the cam plate 201 is suppressed.

Thus, under this seat occupant holding condition of the seat cushion 20, the latched condition of the seat slide latching mechanism 200 can not be cancelled by the second control handle 146.

When now up-folding of the seat cushion 20 is needed, the first control handle 144 (viz., operation lever 110) is pulled upward in FIG. 12 by such a degree that the same is brought into contact with the raised stopper piece 102C (see FIG. 9). During this, the first pivot shaft 108 is also rotated in the same direction because the integral connection between the operation lever 110 and the first pivot shaft 108. Furthermore, during this, the latching plate 112 is rotated in the same direction together with the operation lever 110 because the bent portion 112C of the latching plate 112 is forced to abut against the operation lever 110, so that the first leg portion 112A of the latching plate 112 becomes disengaged from the stepped portion 120C of the first latch member 120. As a result, due to the force of the coil spring 124, the first latch member 120 is returned to its original or inoperative position releasing the first striker 24.

Thus, thereafter, the seat cushion 20 is permitted to pivot freely about the pivot shaft 18 (see FIGS. 1 and 2).

During the above-mentioned pivoting movement of the operation lever 110, the pawl member 118 secured to the first pivot shaft 108 is simultaneously rotated, so that the pawl 118A of the pawl member 118 becomes engaged with the recess 136A of the arm member 136 preventing the second control handle 146 from pivoting the arm member 136. Thus, during the operation of the operation lever 110, the latch cancelling operation of the seat slide latching mechanism 200 is inhibited.

When the seat cushion 20 thus released is folded up or pivoted in a clockwise direction in FIG. 1 by a certain degree, the second striker 26 is led into the recess 102B of the base structure (102+104) and collides with both the lower shoulder portion 110A of the operation lever 110 and the latch condition detecting lever 114 to rotate them in a clockwise direction in FIG. 12.

Finally, the movement of the second striker 26 induces a so-called "second striker latching condition" of FIG. 13 wherein the second striker 26 is caught by both the recess 110B of the operation lever 110 and the recess 114A of the detecting lever 114. It is to be noted that the collision of the second striker 26 against the levers 110 and 114 is damped by the damper device 142.

The seat cushion 20 thus assumes the folded-up and latched position as shown in FIG. 2.

As is seen from FIG. 11, under this condition, by the second striker 26, the latch condition detecting lever 114 is forced to assume its leftmost position against the force of the spring 132, so that the second bent portion 114C of the lever 114 is disengaged from the first stopper part 134A of the stopper member 134. Accordingly, under such condition, manipulation of the second control handle 146 for cancelling the latched condition of the seat slide latching mechanism 200 is permitted.

That is, when the second control handle 146 is pivoted upward rotating the second pivot shaft 130, the arm member 136 is rotated and thus the connecting link 138 is pulled (see FIG. 3) to pivot the cam plate 201 of the seat slide latching mechanism 200. Due to the pivoting of the cam plate 201, the latch member 30 is moved down against the force of the spring 32 (see FIG. 4) releasing the latch pawls 30C1 of the latch member 30 from the lock openings 12B of the lower rail 12. Thus, the latched engagement of the upper rail 14 relative to the lower rail 12 becomes cancelled.

Accordingly, in this condition, the seat assembly 10 can move freely toward the front position with the seat cushion 20 kept folded up and latched. More specifically, the forward movement of the seat assembly 10 is permitted only when the seat cushion 20 takes the folded-up and latched position.

During the pivoting movement of the arm member 136 by the second control handle 146, the arcuate peripheral portion 136B of the arm member 136 is kept in engagement with the pawl 118A of the pawl member 118 preventing rotation of the first pivot shaft 108. Thus, latch cancelling operation of the seat cushion latching mechanism 100 by the first control handle 144 is inhibited.

During the forward movement of the seat assembly 10, the second control handle 146 is released from an operator's hand. Thus, during this movement, the latch pawls 30C1 of the latch member 30 are biased to slide on and along the lower surfaces of the upper side of the lower rail 12 due to the biasing force of the spring 32 (see FIG. 4). When thus the seat assembly 10 comes to the given front position, the latch pawls 30C1 of the latch member 30 are forced to fall into the front group of lock openings 12B establishing a latched engagement of the upper rail 14 with the lower rail 12 at the newly set front position.

The seat assembly 10 thus assumes the front latched position with the seat cushion 20 assuming the folded-up latched position, and thus, a larger luggage space is defined behind the seat assembly 10 in the vehicle cabin.

When the occupant holding condition of the seat assembly 10 is needed again, the second control handle 146 is manipulated to unlatch the upper rail 14 from the lower rail 12 and the seat assembly 10 is moved to the given rear position. For the same reason as is mentioned hereinabove, upon arrival of the seat assembly 10 at the rear given position, a latched engagement between the upper and lower rails 14 and 12 is established, as is understood from FIG. 2.

Then, for cancellation of the latched condition of the folded-up seat cushion 20, the first control handle 144 (viz., operation lever 110) is pulled upward by such a degree that the operation lever 110 becomes in contact with the stopper piece 102C of the side wall 102b of the base structure (102+104). With this operation, the striker catching recess 110B of the operation lever 110 releases the second striker 26. Thus, thereafter, the seat cushion 20 is permitted to pivot downward freely about the pivot pin 18.

During the pivoting movement of the operation lever 110, the pawl 118A of the pawl member 118 is in engagement with the arcuate recess 136A of the arm member 136 and thus the latch cancelling operation of the seat slide latching mechanism 200 by the second control handle 146 is inhibited.

In fact, when one of the seat cushion latching mechanism 100 and the seat slide latching mechanism 200 is being manipulated for cancelling the latched condition, the other mechanism is prevented from cancelling the latched condition. Accordingly, unexpected sliding of the seat assembly 10 during manipulation of the first control handle 144 of the seat cushion latching mechanism 100 and unexpected pivoting movement of the seat cushion 20 during manipulation of the second control handle 146 of the seat slide latching mechanism 200 are suppressed.

It is to be noted that, as is seen from FIG. 3, the upward pivoting of the first control handle 144 causes a clockwise pivoting of the cam plate 116 pressing the bent upper portion 42A of the actuating lever 42 downward. Since, in this state, the actuating lever 42 is placed just above the positioning opening 12C of the lower rail 12, the actuating lever 42 thus pressed is inserted into the opening 12C allowing full pivoting of the cam plate 116.

Thus, if the seat assembly 10 fails to take the proper rear (or front) position, the insertion of the actuating lever 42 into the positioning opening 12C is not permitted, and thus, the upward pivoting of the first control handle 144 is not permitted. This means that when the seat assembly 10 is not properly placed at the given rear (or front) position, the latched condition of the folded seat cushion 20 can not be cancelled.

When the seat cushion 20 thus released is pressed downward, the first striker 24 is led into the aligned recesses 102A and 104B of the base structure (102+104) and collides against the lower peripheral side 120A of the first latch member 120 to rotate the member 120 in a counterclockwise direction in FIG. 9 against the force of the coil spring 124. The insertion of the first striker 24 into the aligned recesses 102A and 104B induces finally the "first striker latching condition" of FIG. 12 which has been described in detail hereinafore. Thus, the seat occupant holding condition as shown in FIG. 1 is established.

In the following, advantageous function of the rail-disconnection inhibiting mechanism will be described.

Usually, the seat assembly 10 assumes the rear or front given latched position. When, due to for example a vehicle collision or the like, a great force is applied to the seat assembly 10 in a direction to pull apart the engaged upper and lower rails 14 and 12, the upper rail 12 is lifted up by such a degree that the latch projections 14C1 of the upper rail 14 are latchingly engaged with the lock openings 12B with which the latch pawls 30C1 of the latch member 30 have been already engaged. That is, upon such vehicle collision, the latched engagement between the upper and lower rails 14 and 12 becomes much assured due to the engagement between the latch projections 14C1 and the lock openings 12B.

It is to be noted that, in the seat slide device of the present invention, the lock openings 12B of the lower rail 12 do serve as the openings for not only the seat slide latching mechanism 200 but also the rail-disconnection inhibiting mechanism. That is, in the present invention, a smaller number of lock openings is only needed by the lower rail 12, and thus, the rail 12 can have a satisfied mechanical strength unlike the case of the afore-mentioned conventional seat slide device.

Although the above description is made with respect to a case wherein only the right-positioned rails 12 and 14 (see FIG. 3) are equipped with the seat slide latching mechanism 200 and the rail-disconnection inhibiting mechanism, the left-positioned rails (not shown) may be equipped with such mechanisms. In this case, the pivot shaft 202 (see FIG. 3) serves as means for transmitting the movement of the connecting link 138 to a cam plate (not shown) of the right-positioned seat slide latching mechanism.

What is claimed is:

1. A seat slide device for a motor vehicle, comprising:
   a lower rail secured to a floor of said vehicle;
   an upper rail slidably engaged with said lower rail and carrying thereon a seat;
   a seat slide latching mechanism including a latch pawl movably held by said upper rail, means for defining at least one lock opening in said lower rail and biasing means for biasing said latch pawl in a direction to achieve a latched engagement between said latch pawl and said locking opening; and
   a rail-disconnection inhibiting mechanism including said lock opening and at least one latch projection which is integral with said upper rail and positioned laterally beside said latch pawl, said latch projection being latchingly engageable with said lock opening when said upper rail is lifted up with respect to said lower rail.

2. A seat slide device as claimed in claim 1, in which said lock opening is so sized and oriented as to receive said latch pawl and said latch projection at the same time.

3. A seat slide device as claimed in claim 2, in which said lower rail has a generally C-shaped cross section and is arranged on said floor having an axially extending slit thereof directed upward, and in which said upper rail has a generally L-shaped cross section and an enlarged base part which is slidably received in and engaged with said lower rail.

4. A seat slide device as claimed in claim 3, in which said latch projection of said rail-disconnection inhibiting mechanism is formed on a side wall defined by said enlarged base part of said upper rail.

5. A seat slide device as claimed in claim 4, in which said side wall of said enlarged base part of said upper rail is a reinforced member.

6. A seat slide device as claimed in claim 5, in which said lock opening is formed in an upper horizontal wall of said lower rail.

7. A seat slide device for a motor vehicle, comprising:
   a lower rail secured to a floor of said vehicle, said lower rail having a generally C-shaped cross section and being arranged on said floor having an axially extending slit directed upward;
   an upper rail slidably engaged with said lower rail, said upper rail having a generally L-shaped cross section and an enlarged base portion which is slidably received in said lower rail;
   a seat slide latching mechanism including:
      a latch member vertically movably held by said upper rail, said latch member having a horizontal upper portion positioned above said upper rail, a vertical middle part passing through the axially extending slit of said lower rail and a generally L-shaped lower portion positioned within said lower rail, said L-shaped lower portion having at an upwardly extending terminal end at least one latch pawl;
      means defining in an upper horizontal wall of said lower rail axially spaced lock openings; and
      biasing means for biasing said latch member in a direction to press said latch pawl against a lower surface of said upper horizontal wall of said lower rail, so that when said upper rail assumes a given position relative to said lower rail, said latch pawl is led into one of said lock openings thereby to achieve a latched engagement between said upper and lower rails; and
   a rail-disconnection inhibiting mechanism including at least one latch projection which is formed on an upwardly extending end of said enlarged base part of said upper rail and positioned laterally beside said latch pawl, said projection being latchingly engageable with said one lock opening of said lower rail when said upper rail is lifted up with respect to said lower rail.

8. A seat slide device as claimed in claim 7, in which said biasing means of said seat slide latching mechanism is a coil spring which is compressed between said horizontal upper portion of said latch member and said upper rail.

9. A seat slide device as claimed in claim 8, further comprising a control mechanism which, when actuated, presses down said latch member against the force of said coil spring to disengage said latch pawl from the lock opening.

* * * * *